United States Patent [19]

Bunce et al.

[11] Patent Number: 5,069,239
[45] Date of Patent: Dec. 3, 1991

[54] FLUID CONTROL METHOD AND DEVICE

[75] Inventors: Kevin R. Bunce, Baldock, England; Tore Sorby, Hokksund, Norway

[73] Assignee: Elopak Systems A.G., Switzerland

[21] Appl. No.: 708,772

[22] Filed: May 10, 1991

Related U.S. Application Data

[63] Continuation-in-part of Ser. No. 301,234, Jan. 24, 1989, abandoned.

[30] Foreign Application Priority Data

Jan. 26, 1988 [GB] United Kingdom ............... 8801665

[51] Int. Cl.⁵ .................... F16K 15/18; B08B 9/03
[52] U.S. Cl. ................................. 137/15; 137/241; 137/522; 141/90; 141/91; 141/DIG. 1; 251/65; 251/340
[58] Field of Search .............. 137/15, 238, 239, 240, 137/241, 522; 251/65, 340; 141/90, 91, DIG. 1

[56] References Cited

U.S. PATENT DOCUMENTS

| 2,698,120 | 12/1954 | Fairchild | 137/247 X |
|---|---|---|---|
| 2,845,099 | 7/1958 | Bailey | 141/91 |
| 3,385,327 | 5/1968 | Granier | 251/65 X |
| 3,500,880 | 3/1970 | Meyer, Sr. | 251/65 X |
| 3,513,024 | 5/1970 | Culliton | 141/91 X |
| 3,650,678 | 3/1972 | Hansen | 137/241 X |
| 3,774,655 | 11/1973 | Trusselle | 141/90 X |
| 4,245,814 | 1/1981 | Shimizu | 251/65 |
| 4,349,042 | 9/1982 | Shimizu | 251/65 X |
| 4,631,923 | 12/1986 | Smith | 137/522 X |
| 4,716,921 | 1/1988 | Rangwala | 137/241 |

FOREIGN PATENT DOCUMENTS

| 2234972 | 2/1973 | Fed. Rep. of Germany . | |
| 3027351 | 2/1981 | Fed. Rep. of Germany | 251/65 |
| 1106163 | 12/1955 | France . | |
| 0110086 | 5/1987 | Japan | 251/65 |
| 2021237 | 11/1979 | United Kingdom | 251/65 |

Primary Examiner—John Rivell
Attorney, Agent, or Firm—Reising, Ethington, Barnard, Perry & Milton

[57] ABSTRACT

A liquid packaging machine includes a filler containing a non-return valve spring-biased closed. The valve includes a closure member to a stem of which is fixed a centering spider, the spokes of which contain iron members. Distributed around the valve housing are horseshoe, permanent magnets. During production of filled cartons, the magnet device is positioned so as not to interfere with the movement of the closure member. However, when air is to be bled from the filler and/or the filler is to be steam-sterilized, the magnet device is positioned to attract the iron members to open the valve against the spring bias.

28 Claims, 3 Drawing Sheets

FLUID CONTROL METHOD AND DEVICE

This is a continuation of application Ser. No. 301,234, filed on Jan. 24, 1989 now abandoned.

BACKGROUND OF THE INVENTION

1. Field of the Invention

This invention relates to a fluid control device, in particular a non-return valve arrangement in a packaging machine.

2. Description of the Prior Art

In liquid packaging machines it is conventional to have dosing fillers containing non-return valves which control the liquid flow through the fillers to the packaging containers. These valves are spring-biassed into their closed positions and are forced open by the liquid as it is pumped stepwise towards the containers. For example, EP0090664A discloses a liquid packaging machine in which the dosing filler comprises upper and lower bellows tubes co-axial with each other and with a first, spring-biassed, non-return valve by way of which the upper bellows tube communicates with the lower bellows tube. The lower bellows tube communicates with a filling nozzle arranged co-axially beneath it and containing a second spring-biassed, non-return valve.

The liquid is pumped through the filler by vertical reciprocation of the first non-return valve.

To sterilize such a filler internally, it is conventional to pump a sterilizing liquid therethrough in the same manner as the filling liquid is pumped therethrough. However, sterilizing liquid residues may remain in the filler and need flushing out before filling can commence. The flushing medium can be steam, in which case the filler becomes full of gaseous matter. To remove the gaseous matter, the product can be pumped through the filler, in which case the product may not be re-usable and the process of removal takes some time.

It may be preferable to employ steam for sterilization, rather than to employ a sterilizing liquid, because any steam residues are simply pure water, but again the filler becomes full of gaseous matter.

Magnetic operation of fluid control valves is well known, as can be seen from, for example, U.S. Pat. Nos. 2,589,188; 3,652,054: 4,349,042; 3,774,878: DE22349-72A; DE3515848 and FR1106163.

The movable closure member of the valve comprises soft or hard magnetic material, or is connected to another member which is of soft or hard magnetic material. Disposed externally of the valve housing is either a permanent magnet movable between an active position in which it controls the closure member and an inactive position, or an electromagnet energisible to control the closure member. FR1106163 and DE 2234972A both discloses non-return valves biassed closed by springs and with electromagnets energisible to open the valve closure members.

SUMMARY OF THE INVENTION

According to one aspect of the present invention, there is provided a method of utilizing ducting containing a non-return valve including biassing means biassing a valve closure member of said valve into a closed position, comprising forcing said valve closure member out of said closed position to an open position against the action of said biassing means by pressing production fluid in said ducting against said valve closure member, whereby said production fluid flows through the open valve; operating magnetic means disposed externally of said ducting to maintain said closure member in an open position against the action of said biassing means; and passing a cleaning fluid through said ducting and the open valve, while said magnetic means maintains said closure member in the latter position.

According to a second aspect of the present invention, there is provided a method of utilizing ducting containing a non-return valve including biassing means biassing a valve closure member of said valve into a closed position, comprising forcing said valve closure member out of said closed position to an open position against the action of said biassing means by pressing production fluid in said ducting against said valve closure member, whereby said production fluid flows through the open valve; substantially ceasing said pressing, whereby said valve closure member returns to said closed position under the action of said biassing means; oparating magnetic means disposed externally of said ducting to displace said closure member out of said closed position into an open position against the action of said biassing means; and passing a cleaning fluid through said ducting and the open valve while said magnetic means maintains said closure member in the latter position.

According to a third aspect of the present invention, there is provided a method of utilizing ducting disposed at an angle to the horizontal and containing a non-return valve including biassing means biassing a valve closure member of said valve upwardly into a closed position, comprising forcing said closure member downwardly out of said closed position to an open position against the action of said biassing means by pressing liquid in said ducting against said closure member, whereby said liquid flows downwards through the open valve; substantially ceasing said pressing, whereby said closure member returns to said closed position under the action of said biassing means; and operating magnetic means disposed externally of said ducting to displace said closure member downwards out of said closed position into an open position against the action of said biassing means, whereby gaseous fluid downstream of said valve may rise through the open valve.

According to a fourth aspect of the present invention, there is provided apparatus comprising ducting; a non-return valve contained in said ducting, said valve comprising a valve closure member and biassing means biassing said closure member into a closed position; pumping means communicating with said ducting and serving to press production fluid against said closure member to force said closure member out of said closed position into an open position against the action of said biassing means; and magnetic means disposed externally of said ducting and operable to maintain said closure member in an open position against the action of said biassing means.

Owing to the invention, it is possible, with ducting containing a non-return valve which is opened by the pressure of production fluid in the ducting, to hold the valve open, in the absence of that opening pressure, to allow passage of a cleaning fluid, or of unwanted gaseous fluid, through the valve.

According to a fifth aspect of the present invention, there is provided in a packaging machine, a filler for filling containers with a production fluid, said filler including ducting, a valve contained in said ducting, said valve including a valve closure member, and magnetic means disposed externally of said ducting and operable to displace said valve closure member relative to said ducting.

This is a particularly advantageous application of a magnetically-controlled valve.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENTS

Figure 1:
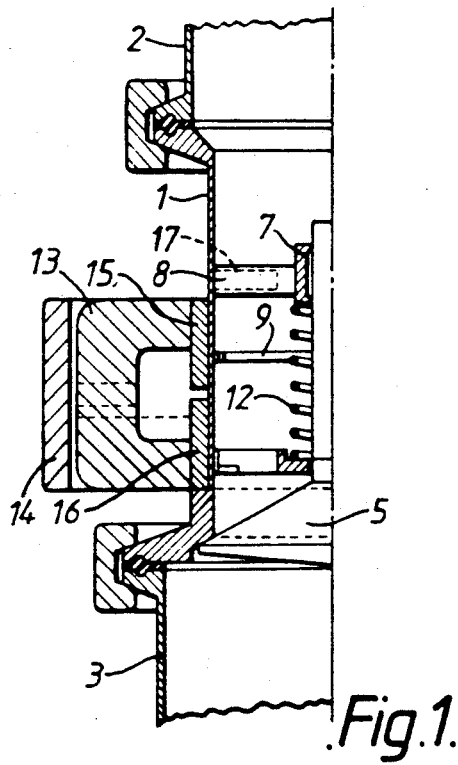
FIG. 1 shows vertical axial sectional half-view through a liquid flow control valve of a filler of an aseptic packaging machine in one condition.
Figure 2:
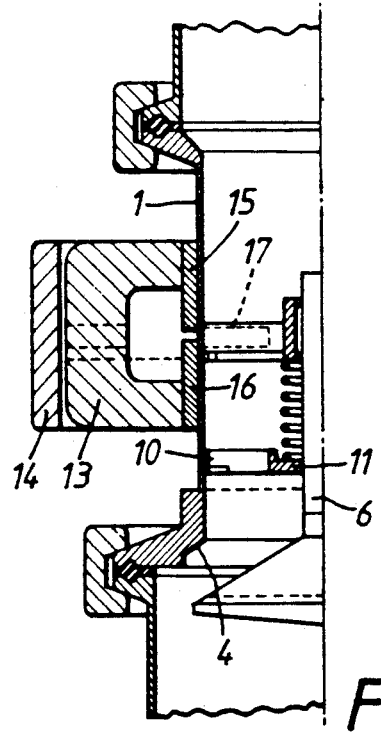
FIG. 2 shows a view similar to FIG. 1 of the valve in another condition.

The valve shown in the FIGS. 1 and 2 is at a filling stage (see FIG. 6) of an aseptic packaging machine (see FIG. 5), in which cartons are filled aseptically with a liquid, such as milk. The valve includes a tubular casing 1 formed of non-magnetic material and sealingly connected coaxially to pipes 2 and 3 of the filler. The lower and outlet end of the casing 1 is formed with a coaxial annular shoulder 4 acting as a valve seat, co-operating with a valve closure member 5 fixed to a valve stem 6. The stem 6 is fixed at its upper end to a hub 7 of a centering spider 8 formed of non-magnetic material and movable with the closure member 5. Beneath the spider 8 is an abutment ring 9 fixed co-axially to the interior of the casing 1. Spaced below the abutment ring 9 and also fixed co-axially to the interior of the casing 1 is a fixed spider 10 having a hub 11 closely encircling the stem 6. A helical compression spring 12 acting between the hubs 7 and 11 urges the movable valve means 5 to 8 upwardly. Distributed at regular angular intervals around the external periphery of the casing 1 are a plurality of horseshoe, permanent magnets 13 which are mounted in an external ring 14 coaxial with the casing 1 and inwardly of which are upper and lower pole rings 15 and 16. Inserted into the spokes of the spider 8 are iron nuts 17 which can be magnetically attracted to the pole rings 15 and 16.

FIG. 1 shows the condition of the parts 13 to 16 during production of filled cartons by the machine. In this condition, the iron nuts 17 remain sufficiently out of the magnetic field between the rings 15 and 16, even when the spider 8 is abutting against the ring 9, that the valve means 5 to 8 can operate without any interference from the magnetic field.

In certain circumstances, when the machine is not producing and air is to be bled from the filler and/or the filler is to be stream-sterilized, it is desired that the valve means 5 to 8 should be held at least partly open against the action of the spring 12. Such a condition, in which the valve is being held fully open, is shown in FIG. 2, in which the nuts 17 are exposed to the concentrated magnetic flux between the pole rings 15 and 16. Thereby, the movable valve means 5 to 8 is held fully open.

To bring the valve from the condition shown in FIG. 1 to that shown in FIG. 2, the assembly 13 to 16 is raised until the iron nuts 17 are magnetically attracted and displaced towards the gap between the rings 15 and 16, and then the assembly 13 to 16 is lowered to open the valve to the required degree. To terminate the magnetic attraction of the iron nuts 17 to the concentrated magnetic flux, the assembly 13 to 16 and thus the magnetic field is then lowered, the abutment ring 9 prevents the iron nuts 17 from following the magnetic field, and the spring 12 displaces the spider 8 upwards.

Figure 3:
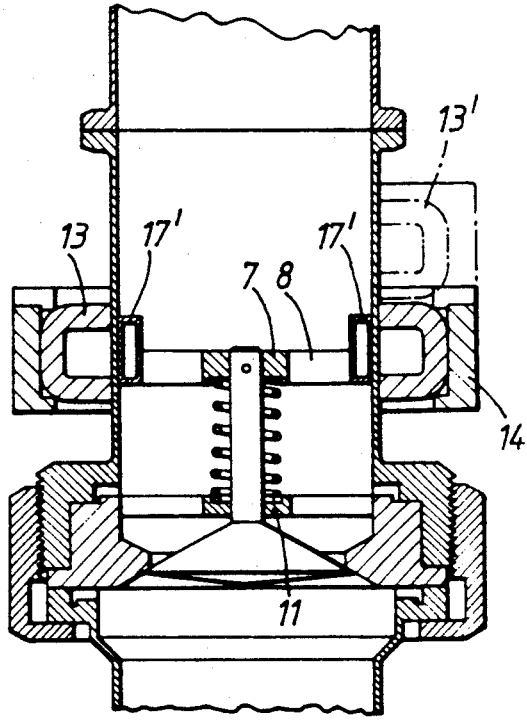
FIG. 3 shows a vertical axial section through a modified version of the filler.
Figure 4:
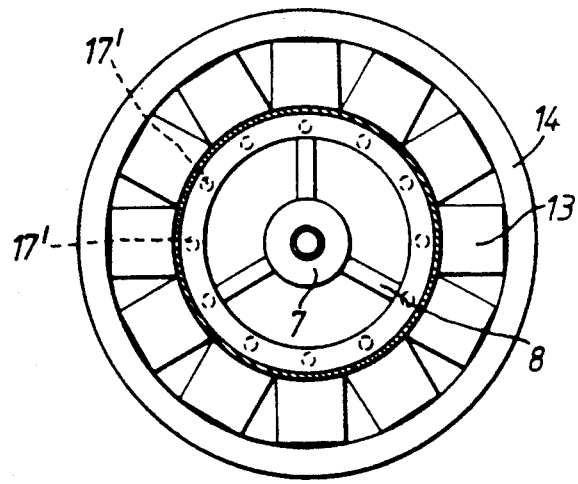
FIG. 4 shows a horizontal section through the modified version.

The version shown in FIGS. 3 and 4 differs from the version shown in FIGS. 1 and 2 chiefly in that the pole rings 15 and 16 are omitted and the iron nuts 17 are replaced by short vertical iron rods 17' totally cast into the spider 8, which is of plastics, and in that the assembly 13 and 14 during the production condition is in an uppermost position indicated in dot-dash lines at 13' in FIG. 3. FIG. 3 shows in full lines the position of the assembly 13 and 14 with the rods 17' spanning the limbs of the horseshoe magnets 13 and with the valve closure member 5 about to be lowered, and thus opened, by lowering of the assembly.

Figure 5:
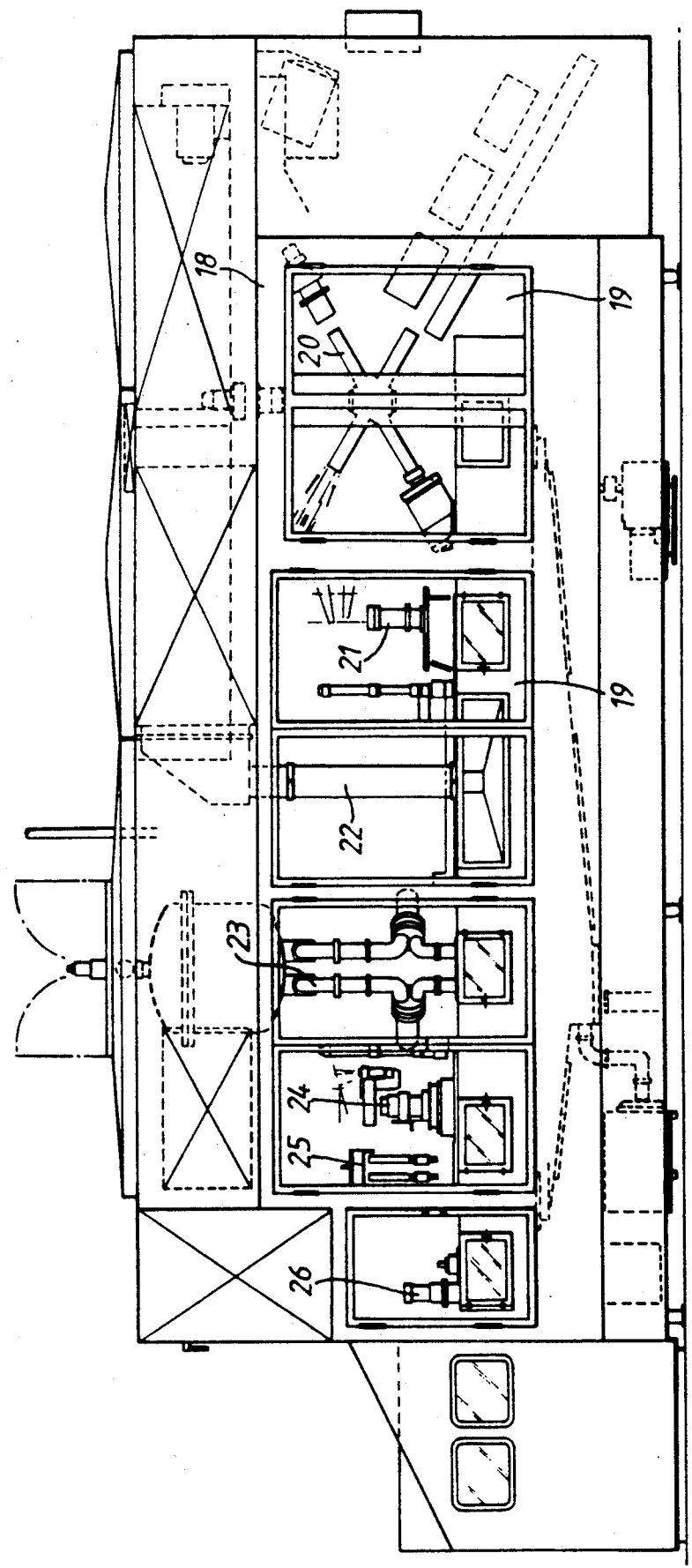
FIG. 5 shows a diagrammatic side elevation of the packaging machine.
Figure 6:
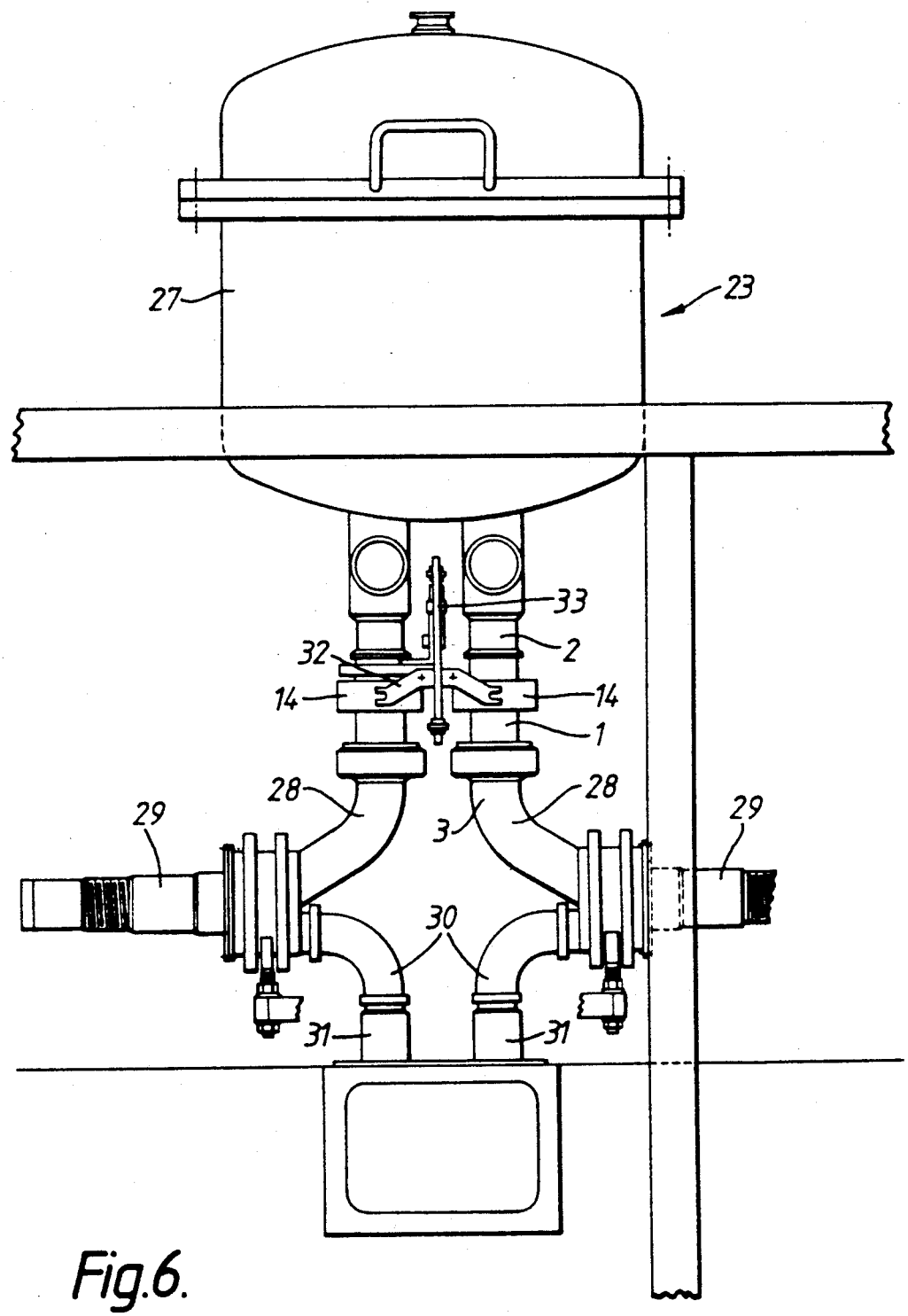
FIG. 6 shows a diagrammatic side elevation of the filler.

Referring to FIGS. 5 and 6, the packaging machine is almost totally enclosed in a housing 18 with openable air-tight transparent windows 19 through which can be seen a bottom closure forming-and-sealing device 20, a top closure breaker 21, a sterile air inlet 22, the filler 23, a top closure heater 24, a top closure sealer 25, and a discharge 26. The filler 23 includes a reservoir 27 for liquid product and ducts 28 leading to respective metering pumps 29 whence respective ducts 30 lead to respective filling nozzles 31. The ducts 28 contain respective valve devices not seen, but each as described with reference to FIGS. 1 and 2, or FIGS. 3 and 4. The rings 14 of the respective valve devices are interconnected by a yoke 32 which can be raised and lowered, to raise and lower the rings 14, by a pneumatic piston-and-cylinder device (not shown) through a linkage 33.

A particular advantage of the valve device described with reference to the drawings is that there is no mechanical control connection from externally to internally of the valve housing, so reducing sealing problems and cleaning problems, and thus reducing the risks of contamination of the product.

Alternatively to the use of permanent magnets, a DC electromagnetic coil could be used.

What is claimed is:

1. A method of utilizing ducting containing a non-return valve including biassing means biassing a valve closure member of said valve into a closed position, comprising forcing said valve closure member out of said closed position to an open position against the action of said biassing means by pressing production fluid in said ducting against said valve closure member, whereby said production fluid flows through the open valve; operating magnetic means disposed externally of said ducting to maintain said closure member in an open position against the action of said biassing means; and passing a cleaning fluid through said ducting and the open valve while said magnetic means maintains said closure member in the latter position.

2. A method according to claim 1, wherein said cleaning fluid is a sterilizing fluid.

3. A method according to claim 2, wherein said sterilizing fluid is steam.

4. A method according to claim 3, wherein said production fluid comprises a liquid foodstuff.

5. A method of utilizing ducting containing a non-return valve including biassing means biassing a valve closure member of said valve into a closed position, comprising forcing said valve closure member out of said closed position to an open position against the action of said biassing means by pressing production fluid in said ductin against said valve closure member, whereby said production fluid flows through the open valve; substantially ceasing said pressing, whereby said valve closure member returns to said closed position under the action of said biassing means; operating magnetic means disposed externally of said ducting to displace said closure member out of said closed position into an open position against the action of said biassing means; and passing a cleaning fluid through said ducting and the open valve while said magnetic means maintains said closure member in the latter position.

6. A method of utilizing ducting disposed at an angle to the horizontal and containing a non-return valve including biassing means biassing a valve closure member of said valve upwardly into a closed position, comprising forcing said closure member downwardly out of said closed position to an open position against the action of said biassing means by pressing liquid in said ducting against said closure member, whereby said liquid flows downwards through the open valve; substantially ceasing said pressing, whereby said closure member returns to said closed position under the action of said biassing means; and operating magnetic means disposed externally of said ducting to displace said closure member downwards out of said closed position into an open position against the action of said biassing means, whereby gaseous fluid downstream of said valve may rise through the open valve.

7. A method according to claim 6, and further comprising, after said ceasing said pressing, passing a gaseous cleaning fluid through said ducting and said valve.

8. A method according to claim 6, wherein said liquid comprises a liquid foodstuff.

9. Apparatus comprising ducting; a non-return valve contained in said ducting, said valve comprising a valve closure member, biassing means biassing said closure member into a closed position, and magnetic portions; pumping means communicating with said ducting and serving to press production fluid against said closure member to force said closure member out of said closed position into an open position against the action of said biassing means; and magnetic means disposed externally of said ducting and operable to influence said magnetic portions magnetically to maintain said closure member in an open position against the action of said biassing means.

10. Apparatus according to claim 9, and in a packaging machine.

11. Apparatus according to claim 10, and in the form of a filler of said packaging machine for filling containers with said production fluid.

12. Apparatus according to claim 9, wherein said valve further comprises a stem carrying said valve closure member and arranged to move therewith, said magnetic portions being carried by said stem and arranged to move therewith.

13. In a packaging machine, a filler for filling containers with a production fluid, said filler including ducting, a valve contained in said ducting, said valve including a valve closure member displaceable between a closed position in which said valve closure member prevents fluid flow through said ducting and an open position in which said valve closure member allows fluid flow through said ducting, biassing means biassing said valve closure member into said closed position against the action of production fluid tending to open said valve closing member against the action of said biassing means, and magnetic means disposed externally of said ducting and operable to retain said valve closure member in said open position against the action of said biassing means.

14. In a packaging machine, a filler according to claim 13, wherein said magnetic means comprises permanent magnet means displaceable between an inactive zone in which said permanent magnet means has substantially no influence upon the movement of said closure member and an active zone in which said movement of said permanent magnet means produces corresponding movement of said closure member.

15. In a packaging machine, a filler according to claim 14, wherein said permanent magnet means comprises horseshoe permanent magnet means including first and second limb means of opposite polarity to each other and wherein said magnetic means defines nonmagnetic gap means.

16. In a packaging machine, a filler according to claim 15, wherein said valve further comprises magnetic portions which substantially span said gap means when said permanent magnet means is in said active zone.

17. In a packaging machine, a filler according to claim 16, wherein said magnetic portions comprise rods extending in the direction from said closed position to said open position.

18. In a packaging machine, a filler according to claim 15, wherein said horseshoe magnet means consists of a plurality of horseshoe magnets distributed around said ducting, said active zone being located along said ducting from said inactive zone.

19. In a packaging machine, a filler according to claim 13, wherein said valve further comprises a stem carrying said valve closure member and arranged to move therewith, and magnetic portions carried by said stem and arranged to move therewith.

20. In a packaging machine, a filler according to claim 19, wherein said magnetic portions are provided by a spider serving to guide the movement of said stem and said closure member and arranged to slide on an internal peripheral surface of said ducting.

21. In a packaging machine, a filler according to claim 20, wherein said spider is of non-magnetic material substantially except for said magnetic portions therein.

22. Apparatus comprising ducting; a non-return valve contained in said ducting, said valve comprising a valve closure member, biassing means biassing said closure member into a closed position, and magnetic portions; pumping means communicating with said ducting for pressing production fluid against said closure member to force said closure member out of said closed position into an open position against the action of said biassing means; and magnetic means disposed externally of said ducting and operable to influence said magnetic portions magnetically to maintain said closure member in an open position against the action of said biassing means, said magnetic means comprising permanent magnet means displaceable between an inactive zone in which said permanent magnet means has substantially no influence upon the movement of said closure member and an active zone in which said movement of said permanent magnet means produces corresponding movement of said closure member.

23. Apparatus comprising ducting; a non-return valve contained in said ducting, said valve comprising a valve closure member, biassing means biassing said closure member into a closed position, and magnetic portion; pumping means communicating with said ducting and serving to press production fluid against said closure member to force said closure member out of said closed position into an open position against the action of said biassing means; magnetic means disposed externally of said ducting and operable to influence said magnetic portions magnetically to maintain said closure member in an open position against the action of said biassing means, and a stem carrying said closure member and arranged to move therewith, said magnetic portions being carried by said stem and arranged to move therewith and being provided by a spider serving to guide the movement of said stem and said closure member and arranged to slide on an internal peripheral surface of said ducting.

24. Apparatus according to claim 23, wherein said permanent magnet means comprises horseshoe permanent magnet means including first and second limb means of opposite polarity to each other and wherein said magnetic means defines non-magnetic gap means.

25. Apparatus according to claim 24, wherein said magnetic portions substantially span said gap means when said permanent magnet means is in said active zone.

26. Apparatus according to claim 25, wherein said magnetic portions comprise rods extending in the direction from said closed position to said open position.

27. Apparatus according to claim 24, wherein said horseshoe magnet means consists of a plurality of horseshoe magnets distributed around said ducting, said active zone being located along said ducting from said inactive zone.

28. Apparatus according to claim 23, wherein said spider is of non-magnetic material substantially except for said magnetic portions therein.

* * * * *